US011921707B2

United States Patent
Agarwal et al.

(10) Patent No.: US 11,921,707 B2
(45) Date of Patent: Mar. 5, 2024

(54) AUTOMATICALLY RECOMMENDING DATABASE ACCESS PATTERNS FOR TRANSACTIONS IN MICROSERVICES

(71) Applicant: International Business Machines Corporation, Armonk, NY (US)

(72) Inventors: Shivali Agarwal, Ghaziabad (IN); Dasari Surya Sai Venkatesh, Vizianagaram (IN); Srikanth Govindaraj Tamilselvam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 17/655,802

(22) Filed: Mar. 22, 2022

(65) Prior Publication Data
US 2023/0306017 A1 Sep. 28, 2023

(51) Int. Cl.
*G06F 16/23* (2019.01)
*G06F 16/22* (2019.01)

(52) U.S. Cl.
CPC ...... *G06F 16/2379* (2019.01); *G06F 16/2282* (2019.01)

(58) Field of Classification Search
CPC .......... G06F 16/2379; G06F 16/2282
See application file for complete search history.

(56) References Cited

U.S. PATENT DOCUMENTS

2019/0356555 A1* 11/2019 Bai ..................... H04L 41/5009
2021/0374850 A1   12/2021 Sankaran et al.

OTHER PUBLICATIONS

"CQRS Design Pattern in Microservices architectures" Mehmet OZkaya, Sep. 8, 2021.*
Richardson, "Pattern: Command Query Responsibility Segregation (CQRS), " copyright 2021, accessed Dec. 24, 2021, 3 pages. https://microservices.io/patterns/data/cqrs.html.
Young, "Command Query Responsibility Segregation (CQRS) pattern," IBM Cloud Architecture Center, accessed Dec. 24, 2021, 15 pages. https://www.ibm.com/cloud/architecture/architectures/event-driven-cqrs-pattern/.
Ryan, "Microservice Design Patterns: Single Database Per Service," Published Apr. 14, 2021, accessed Dec. 24, 2021, 7 pages. https://kenzanmedia.medium.com/microservice-design-patterns-single-database-per-service-bfa36728e862.

(Continued)

*Primary Examiner* — Etienne P Leroux
*Assistant Examiner* — Cindy Nguyen
(74) *Attorney, Agent, or Firm* — Yee & Associates, P.C.

(57) ABSTRACT

Recommending database access patterns for transactions in microservices is provided. A recommendation of a particular database access pattern to improve access by transactions to data in fields of tables in a database corresponding to a microservice is generated based on analysis of field access graphs for the tables accessed by the transactions. The recommendation of the particular database access pattern is output. The particular database access pattern is implemented to improve access by the transactions to the data in the fields of the tables in the database corresponding to the microservice to improve performance of the microservice based on user input and read view implementation guidance.

20 Claims, 10 Drawing Sheets

(56) References Cited

OTHER PUBLICATIONS

Kappagantula, "Everything You Need To Know About Microservices Design Patterns," Published Nov. 25, 2020, accessed Dec. 24, 2021, copyright 2021 Brain4ce Education Solutions Pvt. Ltd., 9 pages. https://www.edureka.co/blog/microservices-design-patterns.

Venkatesh et al., "Part 1: A comparison of CRUD and CQRS patterns using shopping cart application," Published Aug. 11, 2021, accessed Mar. 3, 2022, 11 pages. https://medium.com/@suryasai.venkatesh/part-1-a-comparison-of-crud-and-cqrs-patterns-using-shopping-cart-application-3f0bd1de09b1.

Venkatesh et al., "Part 2: A comparison of CRUD and CQRS patterns using shopping cart application," Published Sep. 3, 2021, accessed Mar. 3, 2022, 7 pages. https://medium.com/@suryasai.venkatesh/part-2-a-comparison-of-crud-and-cqrs-patterns-using-shopping-cart-application-1f7484cb2d78.

\* cited by examiner

AUTOMATICALLY RECOMMENDING DATABASE ACCESS PATTERNS FOR TRANSACTIONS IN MICROSERVICES

BACKGROUND

1. Field

The disclosure relates generally to microservices and more specifically to automatically recommending and implementing a particular database access pattern for transactions to access data of a database corresponding to a microservice based on a system description of the microservice.

2. Description of the Related Art

Microservices are an architectural approach in which a single application is composed of many loosely coupled and independently deployable smaller components or services. These services typically have their own technology stack, which includes a database and data management model, and communicate with one another over a combination of REST APIs, event streaming, and message brokers. In other words, each microservice is autonomous and has its own database relevant to its functionality.

The difference between microservices and a monolithic architecture is that microservices compose a single application from many smaller, loosely coupled services as opposed to the monolithic approach of a large, tightly coupled application. It is common for microservices architectures to be adopted for cloud-native applications, serverless computing, and applications using lightweight container deployment.

SUMMARY

According to one illustrative embodiment, a computer-implemented method for recommending database access patterns for transactions in microservices is provided. A computer generates a recommendation of a particular database access pattern to improve access by transactions to data in fields of tables in a database corresponding to a microservice based on analysis of field access graphs for the tables accessed by the transactions. The computer outputs the recommendation of the particular database access pattern. The computer implements the particular database access pattern to improve access by the transactions to the data in the fields of the tables in the database corresponding to the microservice to improve performance of the microservice based on user input and read view implementation guidance provided by the computer. According to other illustrative embodiments, a computer system and computer program product for recommending database access patterns for transactions in microservices are provided.

DETAILED DESCRIPTION

Figure 1:
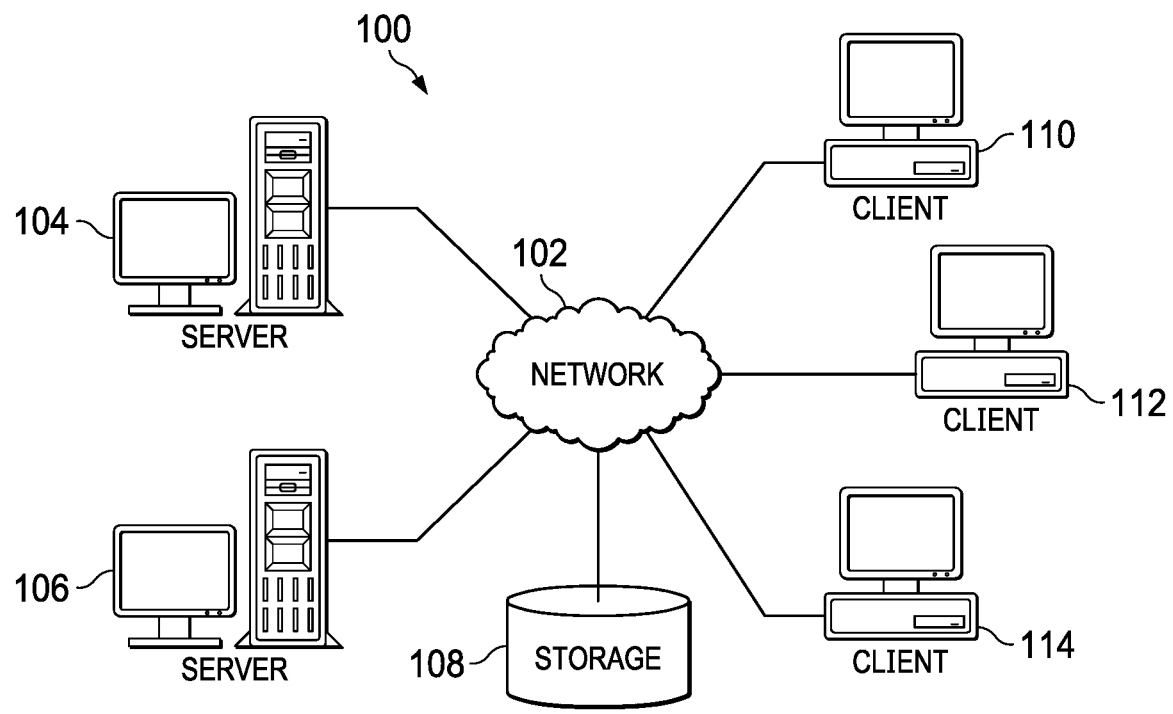
FIG. 1 is a pictorial representation of a network of data processing systems in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
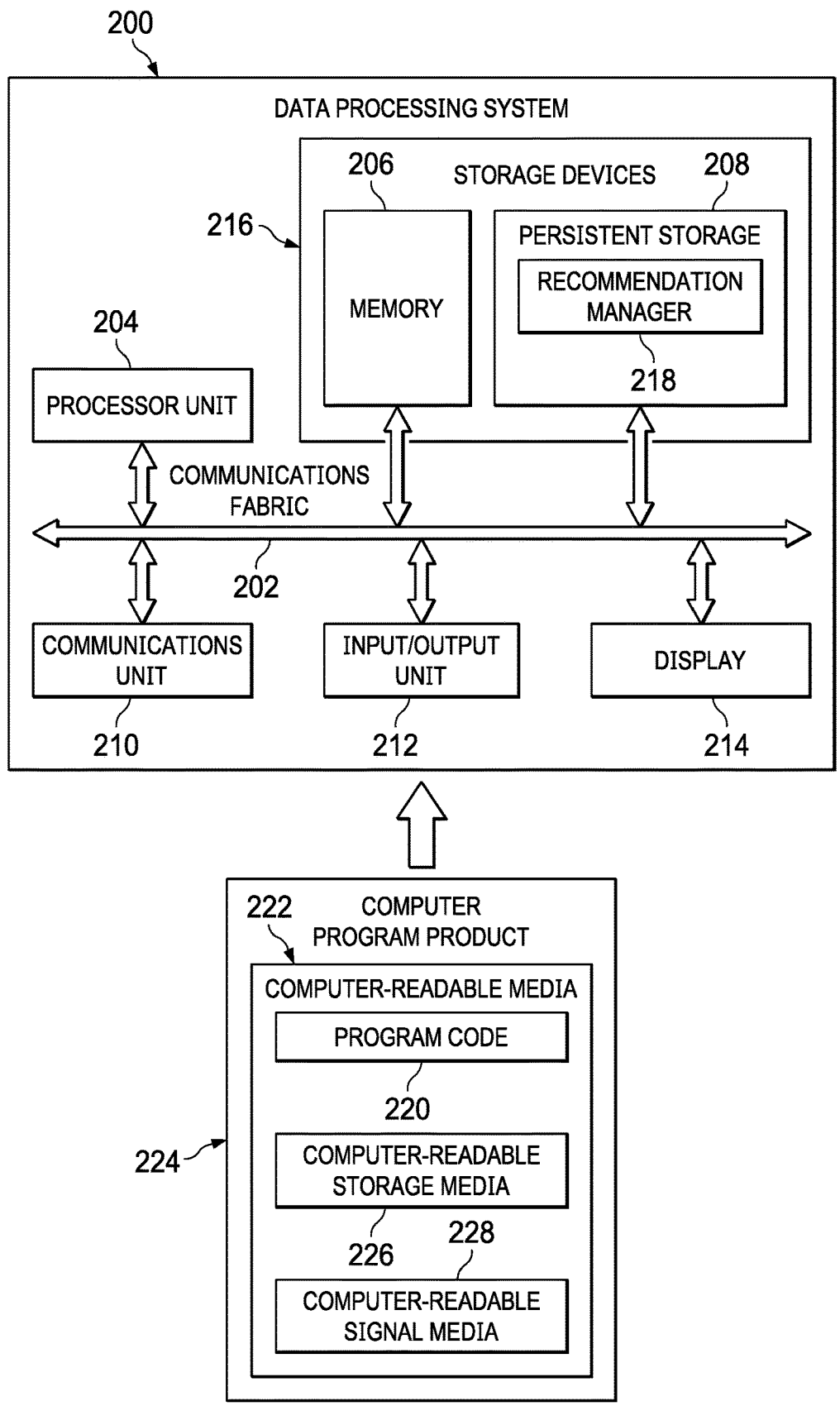
FIG. 2 is a diagram of a data processing system in which illustrative embodiments may be implemented.
Figure 3:
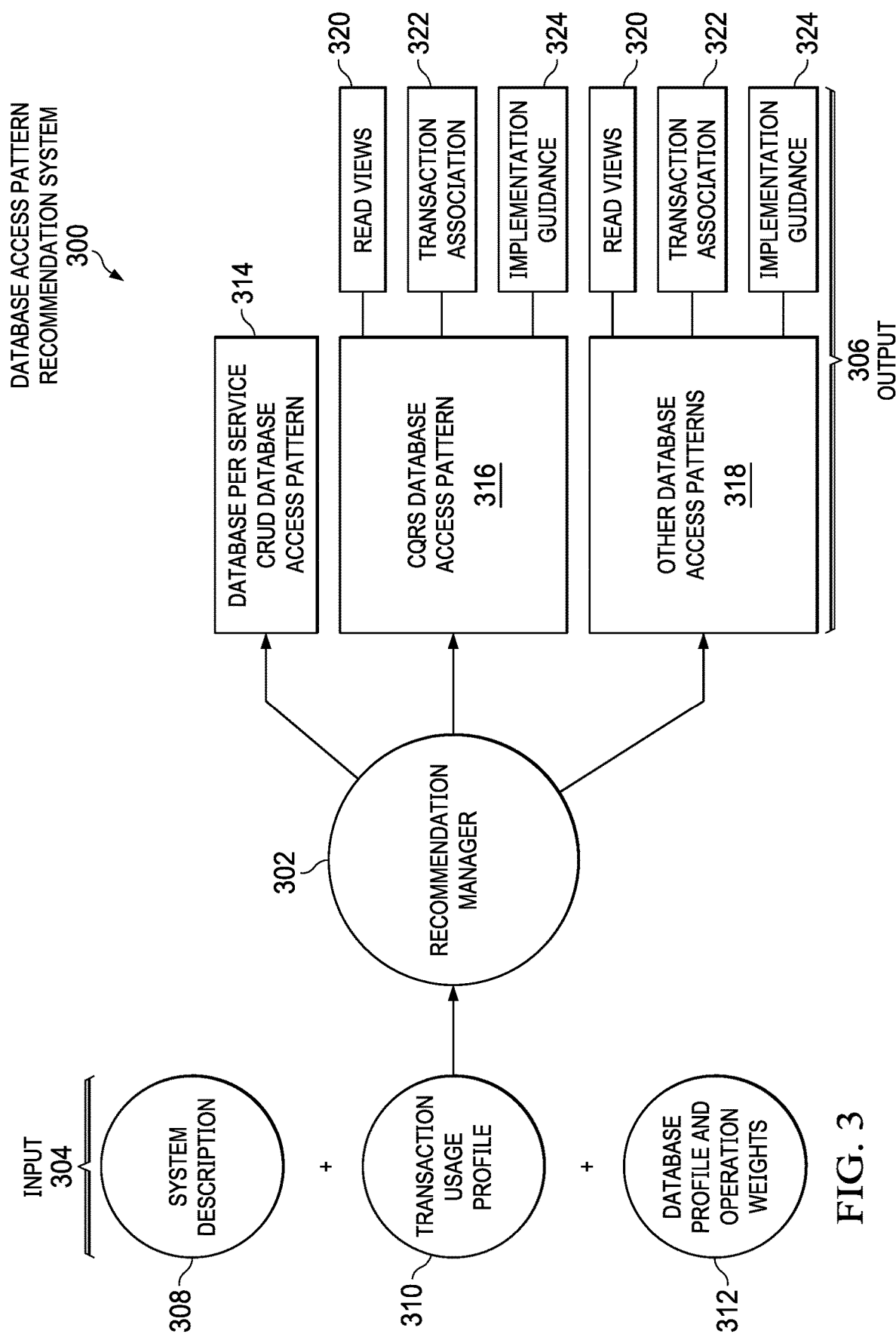
FIG. 3 is a diagram illustrating an example of a database access pattern recommendation system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, server 104 and server 106 may each represent multiple computing nodes in one or more cloud environments. Alternatively, server 104 and server 106 may each represent a cluster of servers in one or more data centers.

In addition, server 104 and server 106 provide a set of services, such as, for example, financial services, banking services, governmental services, educational services, reservation services, data services, event monitoring services, and the like, to client devices. It should be noted that each respective service is comprised of a plurality of microservices.

A microservice architecture is most beneficial when data access is mutually exclusive as much as possible. Several available database access patterns, such as database per service, Command Query Responsibility Segregation (CQRS), and the like, exist for microservice architectures. The CQRS data access pattern separates write and read operations for a database.

In application modernization, when a monolithic application is split into microservices, a suitable database access pattern should be used for each of the microservices. Otherwise, a few microservices may not perform as expected or the performance of a microservice, which could be gained by using a suitable database access pattern, is wasted.

Currently, no automated solutions exist that analyze transactions in microservices and recommend which database access pattern is appropriate for a particular microservice design and functionality. Even if the developers have sufficient knowledge of how different design patterns work, finding its applicability manually for large transactions can be overwhelming and a tedious task.

Server 104 and server 106 recommend and implement a particular database access pattern for each particular microservice to optimize performance of that particular microservice and, therefore, improve performance of server 104 and server 106, themselves. Server 104 and server 106 receive transactions of a microservice as input and output the appropriate database access pattern that should be used by the microservice to obtain optimal system performance while maintaining data consistency. It should be noted that illustrative embodiments are applicable for existing microservice designs, as well as for modernization of a monolithic application to microservices.

In the database access pattern for database per service, each microservice has one database where all of the data corresponding to that microservice is stored in tables of that database. All operations, such as, for example, create, read, update, and delete (e.g., CRUD) operations, for that particular microservice are performed on that same database corresponding to the microservice. This is the most used database access pattern by microservices.

In the database access pattern for CQRS, command means writes, such as create, update, and delete, while query means reads, such as get. This separation leads to benefits in certain types of database access patterns. If server 104 and server 106 do not select the right database access pattern for a microservice, then the microservice may experience degraded performance.

Typically, the CQRS database access pattern should be used for a microservice when the number of database read operations of the microservice is higher than the number of database write operations. However, selecting the CQRS database access pattern for a microservice is not that simple. For example, the CQRS database access pattern should be used for a microservice when there is a separation between executed read operations and write operations. Now, if separation exists between executed reads and writes and the number of reads is greater than the number of writes, then the separation between executed reads and writes will enable more scenarios where the CQRS database access pattern is suitable for a microservice even when the number of writes is high. Server 104 and server 106 determine this separation between executed read operations and write operations by calculating the write effect (i.e., the effect of write operations) on read operations, which server 104 and server 106 determine by generating a field access graph corresponding to a given table accessed by the microservice. The field access graph shows the relationships between transactions, database operations, and particular fields accessed in that table.

In a use case where reads and writes are not mutually exclusive and strong data consistency is not needed, the CQRS database access pattern is also applicable. However, implementing the CQRS database access pattern for a microservice is a non-trivial task. As a result, server 104 and server 106 ensure that the CQRS database access pattern is the most appropriate data access pattern for a microservice before implementing the CQRS database access pattern for that microservice.

Client 110, client 112, and client 114 also connect to network 102. Clients 110, 112, and 114 are client devices of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart glasses, smart televisions, smart vehicles, smart appliances, virtual reality devices, gaming devices, kiosks, and the like, with wire or wireless communication links to network 102. Users of clients 110, 112, and 114 may utilize clients 110, 112, and 114 to access and utilize the services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of client devices, identifiers for a plurality of client device users, system descriptions for microservices, transaction usage profiles, operation weights, database profiles, databases corresponding to the microservices, and the like. Furthermore, storage 108 may store other types of data, such as authentication or credential data that may include usernames, passwords, and the like associated with, for example, client device users and system administrators.

In addition, it should be noted that network data processing system 100 may include any number of additional servers, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to client 110 over network 102 for use on client 110.

In the depicted example, network data processing system 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the database access pattern recommendation processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory, or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores recommendation manager 218. However, it should be noted that even though recommendation manager 218 is illustrated as residing in persistent storage 208, in an alternative illustrative embodiment recommendation manager 218 may be a separate component of data processing system 200. For example, recommendation manager 218 may be a hardware component coupled to communication fabric 202 or a combination of hardware and software components. In another alternative illustrative embodiment, a first set of components of recommendation manager 218 may be located in data processing system 200 and a second set of components of recommendation manager 218 may be located in a second data processing system, such as, for example, server 106 in FIG. 1.

Recommendation manager 218 controls the process of automatically recommending and implementing an appropriate database access pattern, such as, for example, a CRUD database access pattern, a CQRS database access pattern, or the like, for transactions to access data in tables of a database corresponding to each respective microservice comprising a service hosted by data processing system 200.

Recommendation manager 218 takes as input transactions that access certain tables in a database corresponding to a microservice and output the appropriate database access pattern that should be used by the microservice on the respective tables. The database corresponding to the microservice may be located in a local storage, such as persistent storage 208, or in a remote storage, such as storage 108 in FIG. 1. Recommendation manager 218 determines the appropriate database access pattern based on the number of database read operations and write operations. It should be noted that all database operations, such as create, update, delete, fetch, and the like, are either read or write operations. As a result, recommendation manager 218 is generic for any type of database access pattern that can be used by a microservice.

Recommendation manager 218 can utilize different types of inputs, such as, for example, static code analysis-based information corresponding to the service application comprised of the microservices, transaction usage data, operation weights, and database performance profile characteristics to automatically generate and implement the database access pattern recommendation for each respective microservice. Recommendation manager 218 can also provide as output the actual read views, write views, and the views associated transactions corresponding to the microservices for the CQRS database access pattern. Further, recommendation manager 218 can provide additional implementation guidance for read views based on operation categories.

As a result, data processing system 200 operates as a special purpose computer system in which recommendation manager 218 in data processing system 200 enables automatic database access pattern recommendation and implementation for microservices. In particular, recommendation manager 218 transforms data processing system 200 into a special purpose computer system as compared to currently available general computer systems that do not have recommendation manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity, Bluetooth® technology, global system for mobile communications, code division multiple access, second-generation, third-generation, fourth-generation, fourth-generation Long Term Evolution, Long Term Evolution Advanced, fifth-generation, or any other wireless communication technology or standard to establish a wireless communications link for data processing system 200. Bluetooth is a registered trademark of Bluetooth Sig, Inc., Kirkland, Washington.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Illustrative embodiments receive as input a system description for a microservice. The system description for the microservice captures all transactions available in the system and interactions of these transactions with database tables corresponding to the microservice inside the system. The system description for each respective transaction includes at a minimum a transaction name and identification of associated queries. Identification of each respective query includes a structured query language (SQL) query name and CRUD information. The CRUD information describes which database operations are performed in which data fields of a table.

As an example system description input, illustrative embodiments can utilize an output of a static code analysis of a service application. In this example system description input, each entry has many fields, but illustrative embodiments only utilize the above-mentioned fields (e.g., transaction names and associated queries).

An optional system description input is a transaction usage profile. For each respective transaction of the microservice, a user can define a transaction usage profile that indicates load on that particular transaction. In other words, the transaction usage profile indicates a volume of that particular transaction in the microservice. The user can define the transaction usage profile in one of several ways. For example, if the user is unfamiliar with the load on that particular transaction, then the user can utilize a default usage profile of "1" for that particular transaction. Alternatively, if the user has knowledge of a real-life load value on that particular transaction in terms of requests per second, then the user can utilize that load value as the usage profile for that particular transaction. As another alternative, if the user does not have knowledge of the real-life load value on that particular transaction, but can estimate what the load will be, then the user can utilize a value between, for example, "0" and "5", where 0 represents low load and 5 represents high load, as the usage profile for that particular transaction.

An optional system description input is database operation weights. For example, the user can define a weight for each particular type of database operation, such as a specified weight for an insert operation, a specified weight for an update operation, a specified weight for a delete operation, a specified weight for a read operation, a specified weight for a filter operation, a specified weight for an aggregation operation, and the like. For example, the user can make write operations more expensive than read operations or make aggregation operations more expensive than single row read operations by adjusting the corresponding weights. However, it should be noted that all operations typically have a similar impact on a database. As a result, unless a special use case exists, there is no need for the user to define the operation weights. In addition, operation weights are only useful when a database profile is also defined.

The database profile, which also is an optional system description input, provides a value that indicates the load that particular database can handle to meet performance requirements. The database profile defines a database load handling capacity and a database threshold. The database load handling capacity indicates a total capacity value in terms of the number of transactions per second that the database can handle at maximum load. The database threshold may be a value that is the same as the database load handling capacity value or may be some other value, such as, for example, 75% of the database load handling capacity value. The database threshold value indicates how much the database access pattern can load the database. As an example, when the database profile indicates that the database has a high load handling capacity and the transaction usage profile indicates a low transaction load as compared to the database load handling capacity, then illustrative embodiments may recommend a different database access pattern as compared to a use case where the transaction usage is higher than the database load handling capacity.

It should be noted that the database access pattern recommendation manager of illustrative embodiments works even when the optional system description inputs are not provided. However, even though the transaction usage profile is an optional input, it is recommended that the transaction usage profile be provided because the recommendation of a particular data access pattern for transactions will be more accurate as the transaction load will be more precisely modeled.

In response to processing the system description input and any optional inputs, illustrative embodiments generate a database access pattern recommendation for transactions to access data in tables of a database corresponding to a microservice. For example, for each database table corresponding to the microservice in the system, the recommendation manager of illustrative embodiments will recommend a particular database access pattern, such as a CRUD database access pattern, a CQRS database access pattern, a CQRS/ES database access pattern, or any other database access pattern. It should be noted that the ES in CQRS/ES stands for event sourcing. Event sourcing is a technique where, instead of storing the current state of data, a series of events (e.g., things that happened to the data) is stored in one table. If, for a particular database table, illustrative embodiments recommend the CQRS database access pattern for transactions, then illustrative embodiments also output the read views, the write views, and the transactions associated with the read and write views, along with implementation guidance. For example, for each read view, illustrative embodiments specify which specific transactions access that particular read view. It should be noted that a read view or a write view is just another table that contains data fields.

In generating the database access pattern recommendation for the microservice, illustrative embodiments generate a table access graph for the microservice. The table access graph captures the interactions between the transactions in the microservice and the database tables corresponding to the microservice. If the database profile is provided and the combined load on all tables corresponding to the microservice is less than the database threshold, then illustrative embodiments recommend the CRUD database access pattern for all tables corresponding to the microservices as all of the tables can be placed in one database. Otherwise, if the database profile is provided and the combined load on all tables corresponding to the microservice is greater than the database threshold, then illustrative embodiments identify connected components via edges in the table access graph. Connected components are two or more nodes of a same type (e.g., transaction nodes for transactions T1 and T2) being connected via edges to the same node of a different type (e.g., a table node for Table 3) in the table access graph.

If illustrative embodiments identify more than one group of connected components in the table access graph, then illustrative embodiments determine whether the combined load on tables for each group of connected components is less than the database threshold. If illustrative embodiments determine that the combined load on tables for each group of connected components is less than the database threshold, then illustrative embodiments recommend the CRUD database access pattern. If illustrative embodiments determine that the combined load on tables for each group of connected components is greater than the database threshold, then illustrative embodiments proceed to generate a field access graph for each table included in the table access graph. A field access graph indicates the relationships between transactions, database operations, and particular fields accessed in a table.

After generating the field access graphs for tables included in the table access graph, illustrative embodiments identify whether any groups of connected components exist in a given field access graph. If illustrative embodiments identify more than one group of connected components in a given field access graph, then illustrative embodiments delete that particular field access graph and utilize the identified groups of connected components to determine how to split the fields of that table into multiple tables. Illustrative embodiments name each respective new table generated by the split as, for example, "tableName_Split-i". Illustrative embodiments then generate a field access graph for each new table generated during the splitting process.

After performing the splitting process above, illustrative embodiments then determine a total write effect value and a total read value for each respective field access graph. Illustrative embodiments determine these total write effect and read values to be 100, for example, and adjust all other values accordingly. It should be noted that this is a normalization step to adjust all the write effect values and the read values to a comparable number. However, it should be noted that the total write effect value and the total read value of 100 is meant as an example only and not as a limitation on illustrative embodiments.

Illustrative embodiments can score each read operation (e.g., a read SQL query) in a transaction according to user-defined write effects and reads ratios for a particular target database access pattern. For example, illustrative embodiments can score a read SQL query in a transaction utilizing information contained within a table of user-defined write effect/read ratios for a CQRS database access pattern, such as, for example, Table 1, which follows:

TABLE 1

| WriteEffect | Read | | |
|---|---|---|---|
| | 0-33.33% Low | 33.33-66.66% Medium | >66.66% High |
| 0-33.33% Low | −0.25 | 1 | 2 |
| 33.33-66.66% Medium | −1 | 0 | 1.5 |
| >66.66% High | −2 | −1.25 | −0.5 |

The first column of Table 1 indicates the normalized value ranges for low, medium, and high for write effects and the first row of Table 1 indicates the normalized value ranges for low, medium, and high for read operations. In this example, if a read SQL query in a transaction is not suitable for the CQRS database access pattern, then the read SQL query is scored negatively in the write effect/read ratios table. Conversely, if a read SQL query in a transaction is suitable for the CQRS database access pattern, then the read SQL query is scored positively in the write effect/read ratios table. In the case of other target database access patterns, the scores can be adjusted according to the user-defined write effect/read ratios.

If the total score of a field access graph, which illustrative embodiments obtain by summation of each value obtained using Table 1 for each read operation in that field access graph, is greater than 0, then illustrative embodiments recommend the CQRS database access pattern according to the example of Table 1 above. If the total score of that field access graph is less than 0, then illustrative embodiments recommend the CRUD database access pattern. If the total score of that field access graph is equal to 0, then illustrative embodiments can recommend either the CRUD or CQRS database access pattern. It should be noted that this type of scoring table (e.g., Table 1 above) can be determined for any write effect/read biased ratio or pattern. Also, it should be noted that Table 1 above is meant as an example only for a CQRS database access pattern and not as a limitation on illustrative embodiments.

If illustrative embodiments recommend a particular database access pattern, then illustrative embodiments determine whether views are needed to be generated for that particular database access pattern. For example, if, for a particular field access graph as determined above, the recommendation is the CRUD database access pattern, then illustrative embodiments determine that no views need to be generated. If the recommendation is the CQRS database access pattern for that particular field access graph, then illustrative embodiments determine that views need to be generated.

Illustrative embodiments generate write views with all fields of that particular field access graph using the write operations only for the CQRS database access pattern. If write operations can be split further based on connected components identified in that particular field access graph, then illustrative embodiments generate a plurality of disjoint write views. As an example, if two write operations in that particular field access graph are writing to a disjoint set of fields, then illustrative embodiments determine that splitting write operations to different tables is needed.

Illustrative embodiments generate read views for the CQRS database access pattern based on categorizing the read operations of the that particular field access graph based on a user-defined table, such as, for example, Table 2, which follows:

TABLE 2

| WriteEffect | Read | | |
| --- | --- | --- | --- |
| | 0-33.33% Low | 33.33-66.66% Medium | >66.66% High |
| 0-33.33% Low | 1 | 1 | 1, 2 |
| 33.33-66.66% Medium | 3 | 3 | 4 |
| >66.66% High | 5, 6 | 6 | 6 |

Illustrative embodiments determine a total write effect value and a total read value for that particular field access graph and then perform a normalization process. The normalization process for write effect and read values follows the same logic as mentioned above. The first column of Table 2 indicates the normalized value ranges for low, medium, and high for write effects and the first row of Table 2 indicates the normalized value ranges for low, medium, and high for read operations.

Illustrative embodiments generate a read view based on all of the fields accessed by operations in the same category. Operations are of type read and write, while category is a number from 1-6 as populated in Table 2. As a result, illustrative embodiments generate the read views for a particular table by grouping the fields involved in read operations of the same category type (e.g., 1, 2, 3, 4, 5, or 6). These categories are designed to generate the read views. The write views typically contain the full table. For example, illustrative embodiments generate a read view of type 1 based on the set of fields accessed by operations of category 1 (i.e., the read operation category). If illustrative embodiments can split the read view based on connected components in that particular field access graph, then illustrative embodiments split the read view. However, the new read views based on the split will be of the same category.

Illustrative embodiments utilize one of a plurality of different types of read views based on the operation categories. For example, for a type 1 read view, write operations are low (<33.33%) and read operations are high (>66.66%), but not that high (e.g., 70%). As a result, for this type 1 read view, any database can be used. In other words, the database does not need to be a read optimized database. Replication of a type 1 read view will not be required, but if illustrative embodiments replicate a type 1 read view, then illustrative embodiments can perform the replication without much of an increase in system overhead. Here, all events will update the type 1 read view as soon as the events arrive at the read side with no aggregation of changes. Thus, this type 1 read view will have fastest eventual data consistency, but it will be eventual data consistency.

For a type 2 read view, write operations are low (<33.33%) and read operations are high (>66.66%), but the read operations are very high (e.g., 85%). Consequently, use of read optimized database is recommended. In addition, based on the database used, illustrative embodiments may need to replicate this type 2 read view and have a load balancer for this type 2 read view. Here, all events will update the type 2 read view as soon as the events arrive at the read side with no aggregation of changes. Thus, this type 2 read view will have fastest eventual consistency, but it will be eventual consistency.

For a type 3 read view, write operations are medium (33.33-66.66%) and read operations are medium (33.33-66.66%) (i.e., approximately the same number write and read operations). Consequently, a database that performs relatively well for both read operations and write operations is recommended. It is not recommended to replicate this type 3 read view. If using a CQRS database access pattern, then this type 3 read view will have a relatively equal number of transactions associated with it.

For a type 4 read view, write operations are medium (33.33-66.66%) and read operations are high (>66.66%), but the read operations are very high (e.g., 90%). Consequently, a database that performs relatively well for both read operations and write operations is recommended. Based on the database used, illustrative embodiments may have to replicate this type 4 read view and have a load balancer for this type 4 read view. It should be noted that for type 3 and type 4 read views, if the operations in these categories can work with delayed eventual data consistency, then illustrative embodiments can aggregate changes and write the changes on a defined time interval basis.

For a type 5 read view, write operations are high (>66.66%), but the write operations are very high (e.g., 95%) and read operations are low (<33.33%). These transactions are small in number in the system. Consequently, illustrative embodiments recommend the CQRS database access pattern. Replication of this type 5 read view is not needed and is not recommended. For this type 5 read view, if the transactions can afford to be slow, then illustrative embodiments use the type 6 read view. Illustrative embodiments aggregate changes in projections until a new service request is received. When a new service request is received, illustrative embodiment retrieve the changes and write the changes into this type 5 read view. If no new service requests are received for a defined period of time, then illustrative embodiments write all remaining changes at expiration of the defined time period.

For the type 6 read view, both write operations and read operations are high (>66.66%). These transactions are relatively small in number in the system. Consequently, illustrative embodiments recommend the CQRS database access pattern. Replication of this type 6 read view is not needed and is not recommended. If illustrative embodiments aggregate transactions, illustrative embodiments keep the aggregated transactions precomputed and maintain them in a separate view. Otherwise, illustrative embodiments will have to reduce write operations significantly either by optimizing the transaction or writing after a defined amount of time.

Illustrative embodiments will generate these different types of read views when the CQRS database access pattern is recommended and implemented. However, it should be noted that illustrative embodiments will rarely utilize types 3, 5, and 6 read views.

Operation categories, where read views can be replicated, illustrative embodiments can utilize other techniques, such as, for example, group transactions in that operation category such that the transactions in the same group have an overlapping set of fields. Then, for each group of transactions, illustrative embodiments generate a separate view, but this view will also be of the same type as its parent view.

Thus, illustrative embodiments provide one or more technical solutions that overcome a technical problem with selecting and implementing the appropriate database access pattern for transactions to access data in a database corresponding to a microservice to improve system performance. As a result, these one or more technical solutions provide a technical effect and practical application in the field of microservices.

With reference now to FIG. 3, a diagram illustrating an example of a database access pattern recommendation system is depicted in accordance with an illustrative embodiment. Database access pattern recommendation system 300 may be implemented in a computer, such as, for example, server 104 in FIG. 1 or data processing system 200 in FIG. 2.

In this example, database access pattern recommendation system 300 includes recommendation manager 302. Recommendation manager 302 may be, for example, recommendation manager 218 in FIG. 2. Recommendation manager 302 receives input 304 and generates output 306.

In this example, input 304 includes system description 308, transaction usage profile 310, and database profile and operation weights 312. System description 308 identifies all transactions and their interactions with tables of a database corresponding to a particular microservice. Transaction usage profile 310 identifies a load (e.g., requests per second) of each respective transaction corresponding to that particular microservice. Database profile and operation weights 312 provide characteristics, such as load capacity and threshold, of the database corresponding to that particular microservice and any predefined weights for different database operations. It should be noted that transaction usage profile 310 and database profile and operation weights 312 are optional inputs to recommendation manager 302.

Recommendation manager 302 processes input 304 to generate output 306. Output 306 is a recommendation for an appropriate particular database access pattern for the transactions to access data more efficiently in the database corresponding to that particular microservice to optimize performance of that particular microservice. In this example, output 306 is one of database per service CRUD database access pattern 314, CQRS database access pattern 316, or other database access pattern 318. If output 306 is either CQRS database access pattern 316 or other database access pattern 318, then recommendation manager 302 also generates read views 320, transaction association 322, and implementation guidance 324 for that particular database access pattern.

Figure 4:
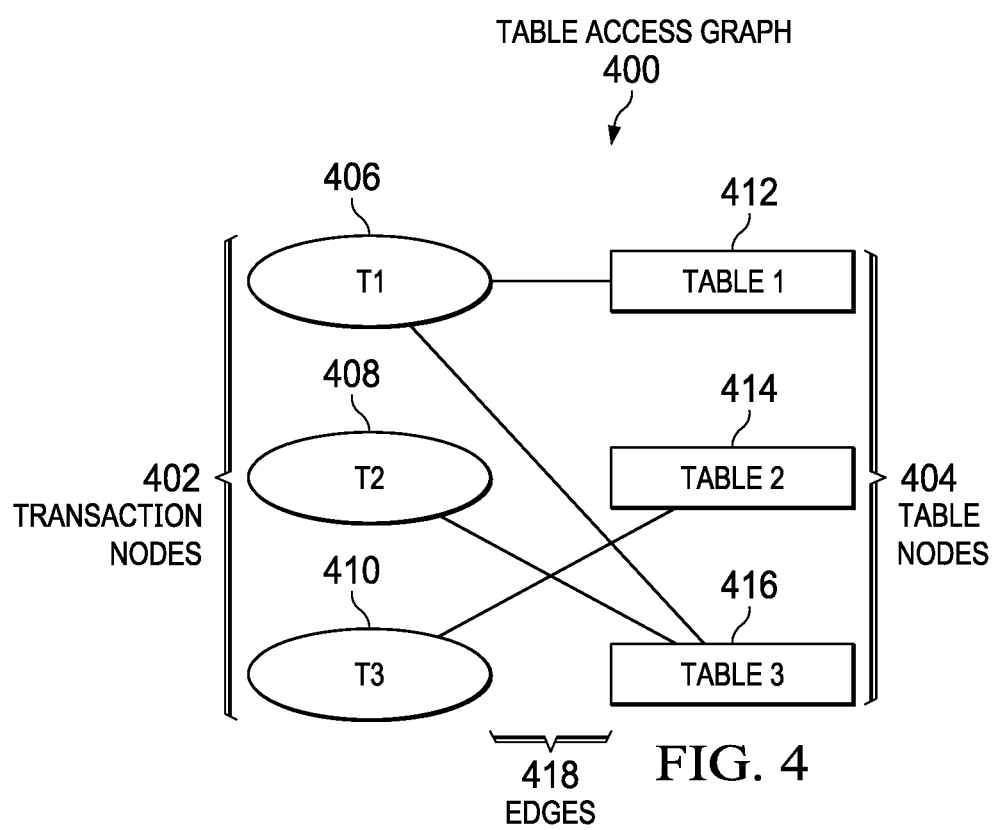
FIG. 4 is a diagram illustrating an example of a table access graph in accordance with an illustrative embodiment.

With reference now to FIG. 4, a diagram illustrating an example of a table access graph is depicted in accordance with an illustrative embodiment. Table access graph 400 can be implemented in a recommendation manager, such as, for example, recommendation manager 218 in FIG. 2 or recommendation manager 302 in FIG. 3.

The recommendation manager of illustrative embodiments generates table access graph 400 for each microservice of a plurality of microservices managed by the recommendation manager. Table access graph 400 captures interactions between transactions in a particular microservice and the database tables corresponding to the microservice. Table access graph 400 is in the form of a bipartite graph or bigraph, whose nodes are divided into two disjoint and independent sets and each edge connects a node in one set to another node in the other set.

In this example, table access graph includes transaction nodes 402 and table nodes 404. Transaction nodes 402 represent transactions, such as transaction T1 406, transaction T2 408, and transaction T3 410, in that particular microservice. Each respective transaction node includes data, such as, for example, transaction name. Table nodes 404 represent tables, such as table 1 412, table 2 414, and table 3 416, in the database corresponding to that particular microservice. Each respective table node includes data, such as, for example, table name, total table value, and total table weight. The total table value represents the number of times that particular table has been invoked. The total table value contains a total read value representing the total number read invocations on that particular table and a total write value representing the total number of write invocations on that particular table. The total table weight represents the weight of the total load on that particular table. The total table weight contains a total read weight on that particular table and a total write weight on that particular table.

Edges 418 in table access graph 400 exist between a transaction node and a table node. Each respective edge stores data, such as, for example, total edge value and total edge weight. The total edge value represents the number of times a corresponding transaction has invoked a corresponding table. The total edge value includes the total number of read invocations on the table by the transaction and the total number of write invocations on the table by the transaction. The total edge weight value represents the weight of all the invocations. The total edge weight value includes the total read weight on the table by the transaction and the total write weight on the table by the transaction. It should be noted that the recommendation manager of illustrative embodiments can determine the table node values from the corresponding edge values.

Figure 5:
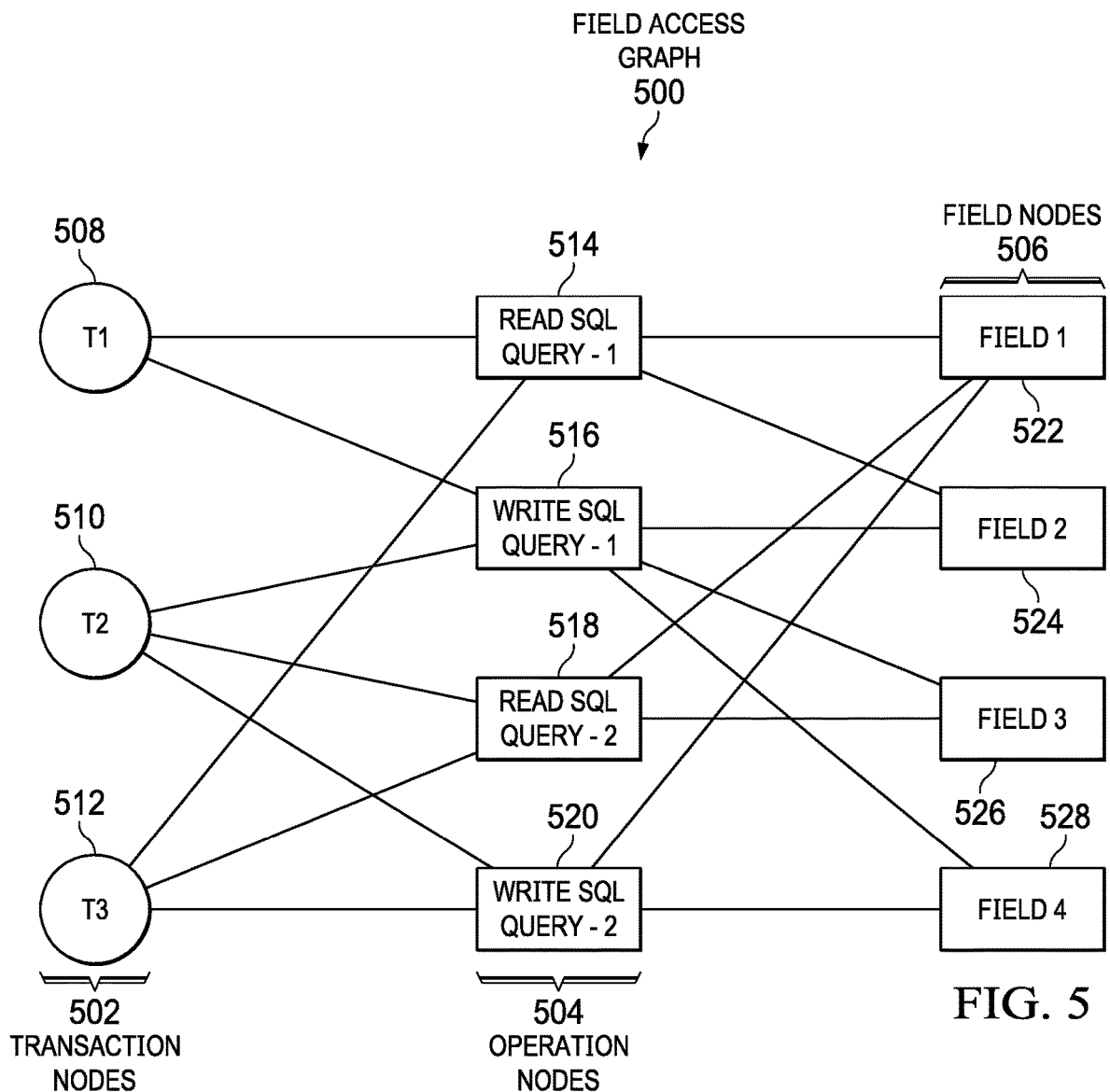
FIG. 5 is a diagram illustrating an example of a field access graph in accordance with an illustrative embodiment.

With reference now to FIG. 5, a diagram illustrating an example of a field access graph is depicted in accordance with an illustrative embodiment. Field access graph 500 can be implemented in a recommendation manager, such as, for example, recommendation manager 218 in FIG. 2 or recommendation manager 302 in FIG. 3.

The recommendation manager of illustrative embodiments generates field access graph 500 to indicate the relationships between transactions, database operations, and fields of a particular table. In other words, field access graph 500 represents database operations done by the transactions on the fields of that particular table. In this example, a read SQL query represents a read operation on a field of the table and a write SQL query represents a write operation on a field of the table.

In this example, field access graph 500 includes transaction nodes 502, operation nodes 504, and field nodes 506. Each respective transaction node, such as transaction T1 508, transaction T2 510, and transaction T3 512, contains a usage profile value for that particular transaction. Operation nodes 504 include read SQL query 1 514, write SQL query 1 516, read SQL query 2 518, and write SQL query 2 520. A read SQL query node represents a read operation on a field of the table and contains a value representing the number of invocations of that particular read SQL query across all transactions of the microservice. The read SQL query node also contains a write effect value that represents the maximum number of writes on fields that particular read SQL query accesses. A write SQL query node represents a write operation on a field of the table and contains a value representing the number of invocations of that particular write SQL query across all transactions of the microservice. Each respective field node, such as field node 1 522, field node 2 524, field node 3 526, and field node 4 528, represents a particular field in the table. A field node includes data, such as, for example, a field node value indicating the total number of times that particular field was accessed, a read value indicating the total number of times that particular field was accessed for read operations, and a write value indicating the total number of times that particular field was accessed for write operations.

Edges in field access graph 500 include a transaction node to operation node edge and an operation node to field node edge. In this example, a transaction to operation edge represents the invocation of a SQL query by a particular transaction. The transaction to operation edge stores the number of invocations of the SQL query by that particular transaction. An operation to field edge represents a field accessed by a particular operation (e.g., SQL query). The operation to field edge does not store any data.

Figure 6:
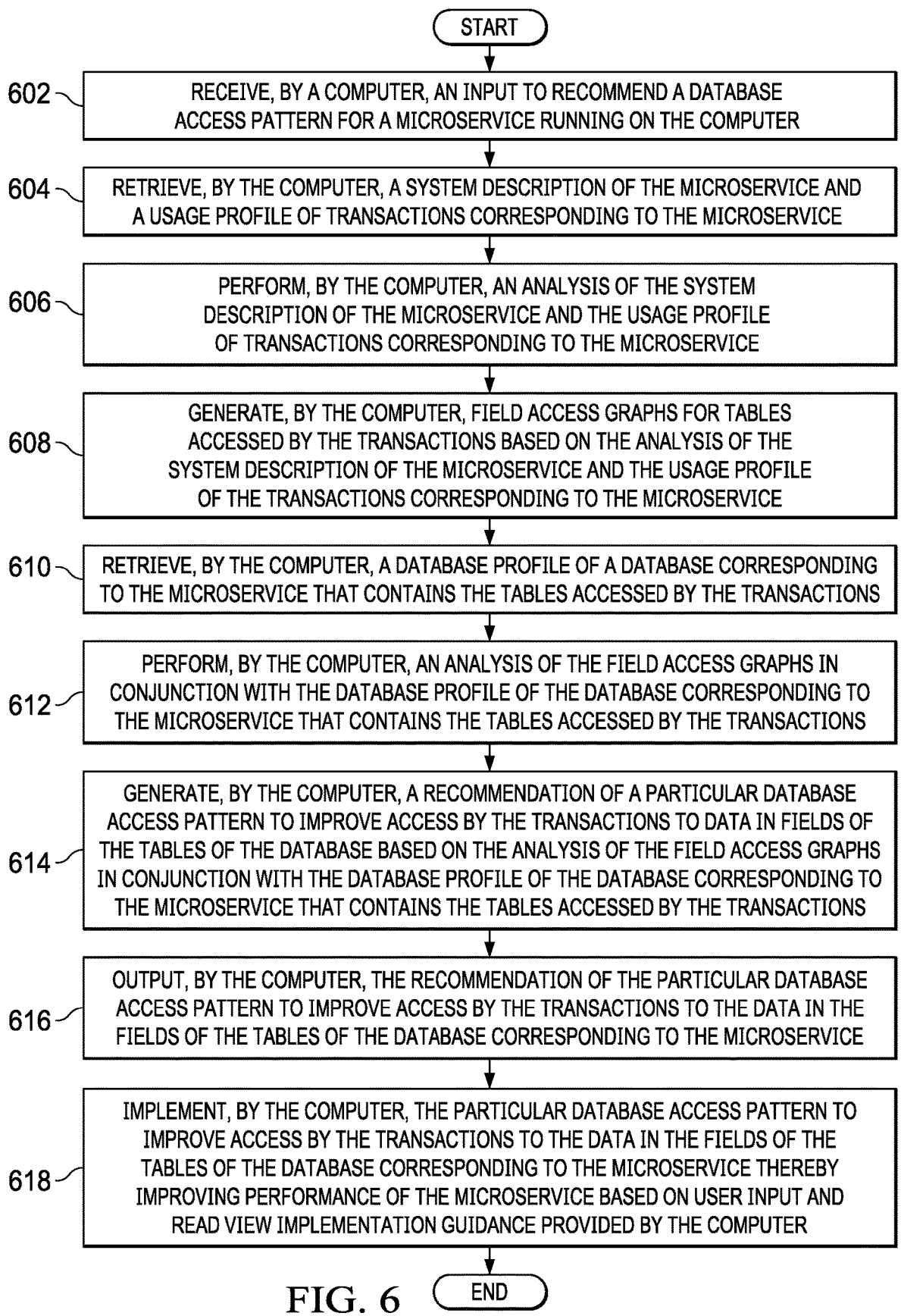
FIG. 6 is a flowchart illustrating a process for implementing a particular database access pattern to improve performance of a microservice in accordance with an illustrative embodiment.

With reference now to FIG. 6, a flowchart illustrating a process for implementing a particular database access pattern to improve performance of a microservice is shown in accordance with an illustrative embodiment. The process shown in FIG. 6 may be implemented in a computer, such as, for example, server 104 in FIG. 1 or data processing system 200 in FIG. 2. For example, the process shown in FIG. 6 may be implemented in recommendation manager 218 in FIG. 2.

The process begins when the computer receives an input to recommend a database access pattern for a microservice running on the computer (step 602). In response to receiving the input, the computer retrieves a system description of the microservice and a usage profile of transactions corresponding to the microservice (step 604). The computer performs an analysis of the system description of the micro service and the usage profile of transactions corresponding to the microservice (step 606).

The computer generates field access graphs for tables accessed by the transactions based on the analysis of the system description of the microservice and the usage profile of the transactions corresponding to the microservice (step 608). In addition, the computer retrieves a database profile of a database corresponding to the microservice that contains the tables accessed by the transactions (step 610). The computer performs an analysis of the field access graphs in conjunction with the database profile of the database corresponding to the microservice that contains the tables accessed by the transactions (step 612).

The computer generates a recommendation of a particular database access pattern to improve access by the transactions to data in fields of the tables of the database based on the analysis of the field access graphs in conjunction with the database profile of the database corresponding to the microservice that contains the tables accessed by the transactions (step 614). The computer outputs the recommendation of the particular database access pattern to improve access by the transactions to the data in the fields of the tables of the database corresponding to the microservice (step 616). Further, the computer implements the particular database access pattern to improve access by the transactions to the data in the fields of the tables of the database corresponding to the microservice thereby improving performance of the microservice based on user input and read view implementation guidance provided by the computer (step 618). Thereafter, the process terminates.

Figure 7:
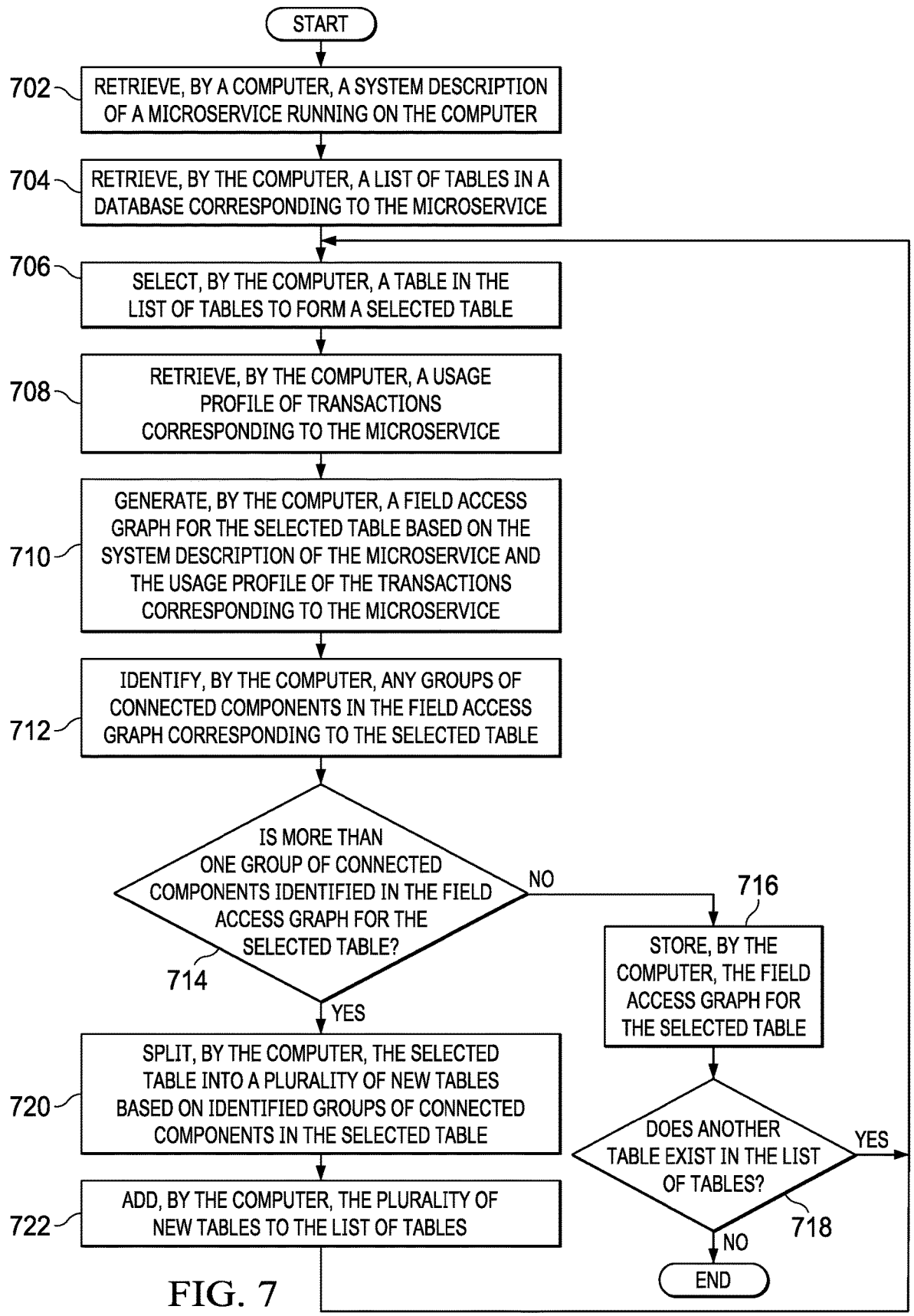
FIG. 7 is a flowchart illustrating a process for generating field access graphs for tables accessed by transactions in a microservice in accordance with an illustrative embodiment.

With reference now to FIG. 7, a flowchart illustrating a process for generating field access graphs for tables accessed by transactions in a microservice is shown in accordance with an illustrative embodiment. The process shown in FIG. 7 may be implemented in a computer, such as, for example, server 104 in FIG. 1 or data processing system 200 in FIG. 2. For example, the process shown in FIG. 7 may be implemented in recommendation manager 218 in FIG. 2.

The process begins when the computer retrieves a system description of a microservice running on the computer (step 702). In addition, the computer retrieves a list of tables in a database corresponding to the microservice (step 704). Afterward, the computer selects a table in the list of tables to form a selected table (step 706).

The computer retrieves a usage profile of transactions corresponding to the microservice (step 708). Further, the computer generates a field access graph for the selected table based on the system description of the microservice and the usage profile of the transactions corresponding to the microservice (step 710). Furthermore, the computer identifies any groups of connected components in the field access graph corresponding to the selected table (step 712).

The computer makes a determination as to whether more than one group of connected components is identified in the field access graph for the selected table (step 714). If the computer determines that more than one group of connected components is not identified in the field access graph for the selected table, no output of step 714, then the computer stores the field access graph for the selected table (step 716). In addition, the computer makes a determination as to whether another table exists in the list of tables (step 718). If the computer determines that another table does exist in the list of tables, yes output of step 718, then the process returns to step 706 where the computer selects another table from the list of tables. If the computer determines that another table does not exist in the list of tables, no output of step 718, then the process terminates thereafter.

Returning again to step 714, if the computer determines that more than one group of connected components is identified in the table access graph for the selected table, yes output of step 714, then the computer splits the selected table into a plurality of new tables based on identified groups of connected components in the selected table (step 720). The computer also adds the plurality of new tables to the list of tables (step 722). Thereafter, the process returns to step 706 where the computer selects another table from the list of tables.

Figure 8A:
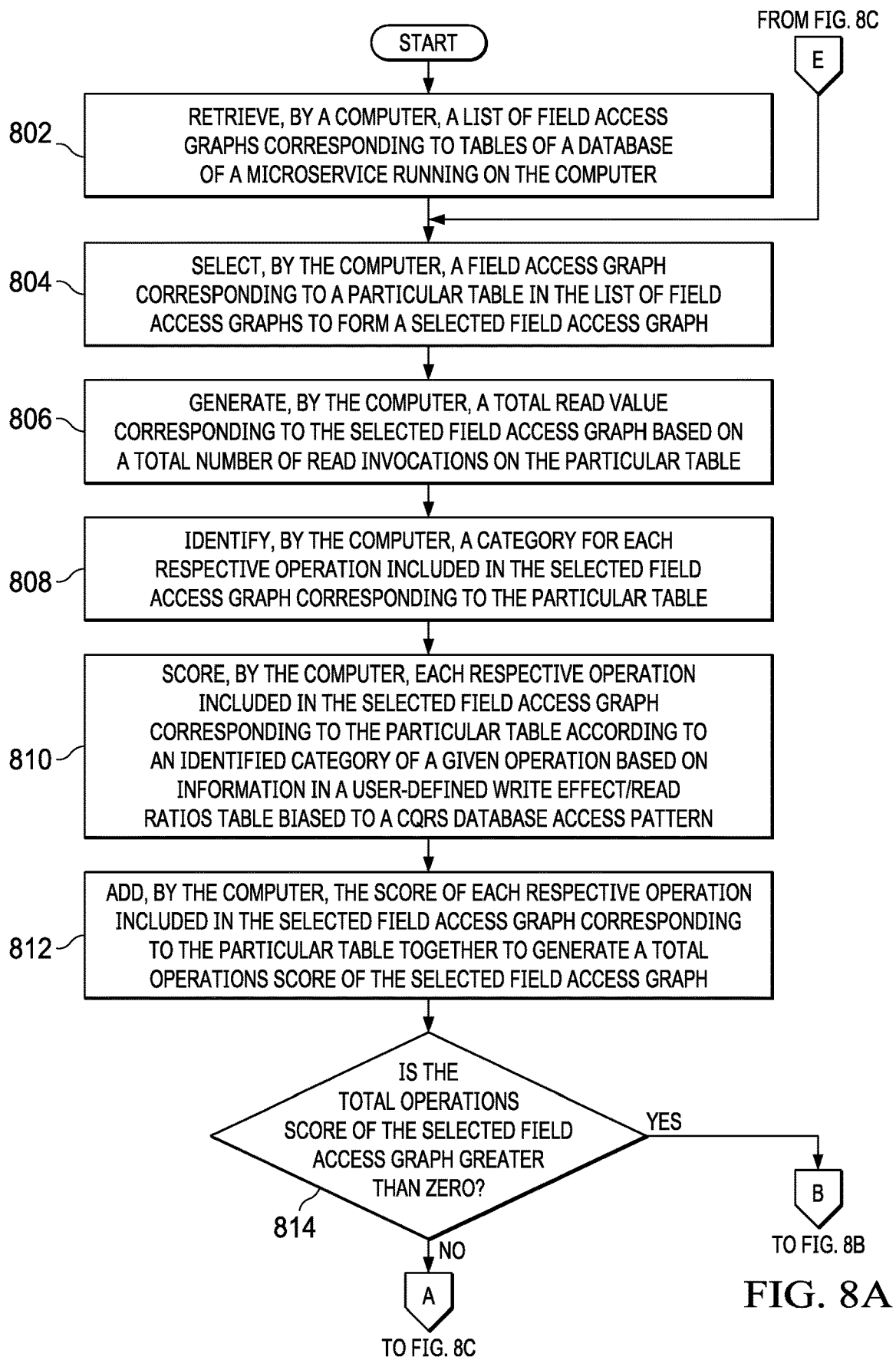
FIGS. 8A-8C are a flowchart illustrating a process for recommending database access patterns for transactions in microservices in accordance with an illustrative embodiment.
Figure 8B:
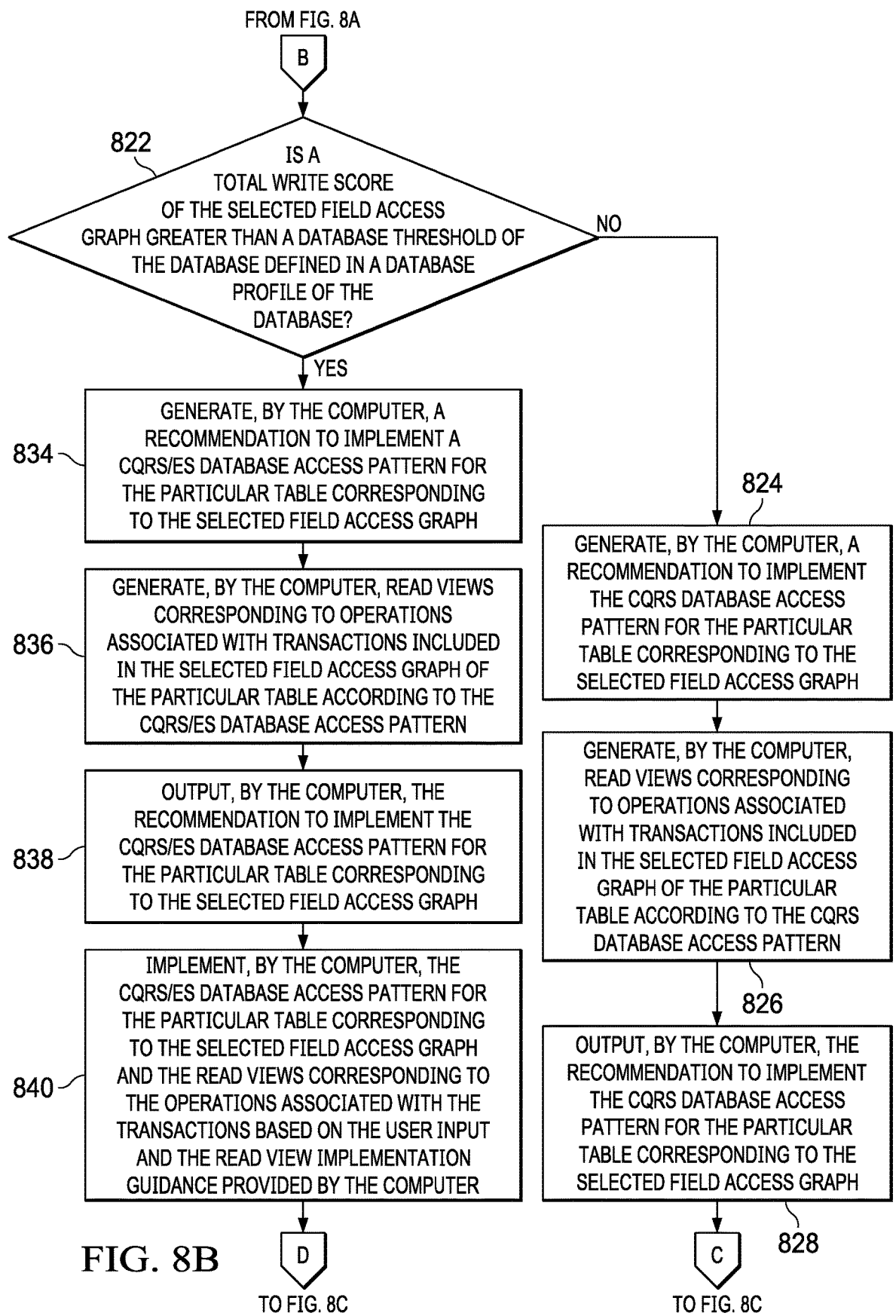
Figure 8C:
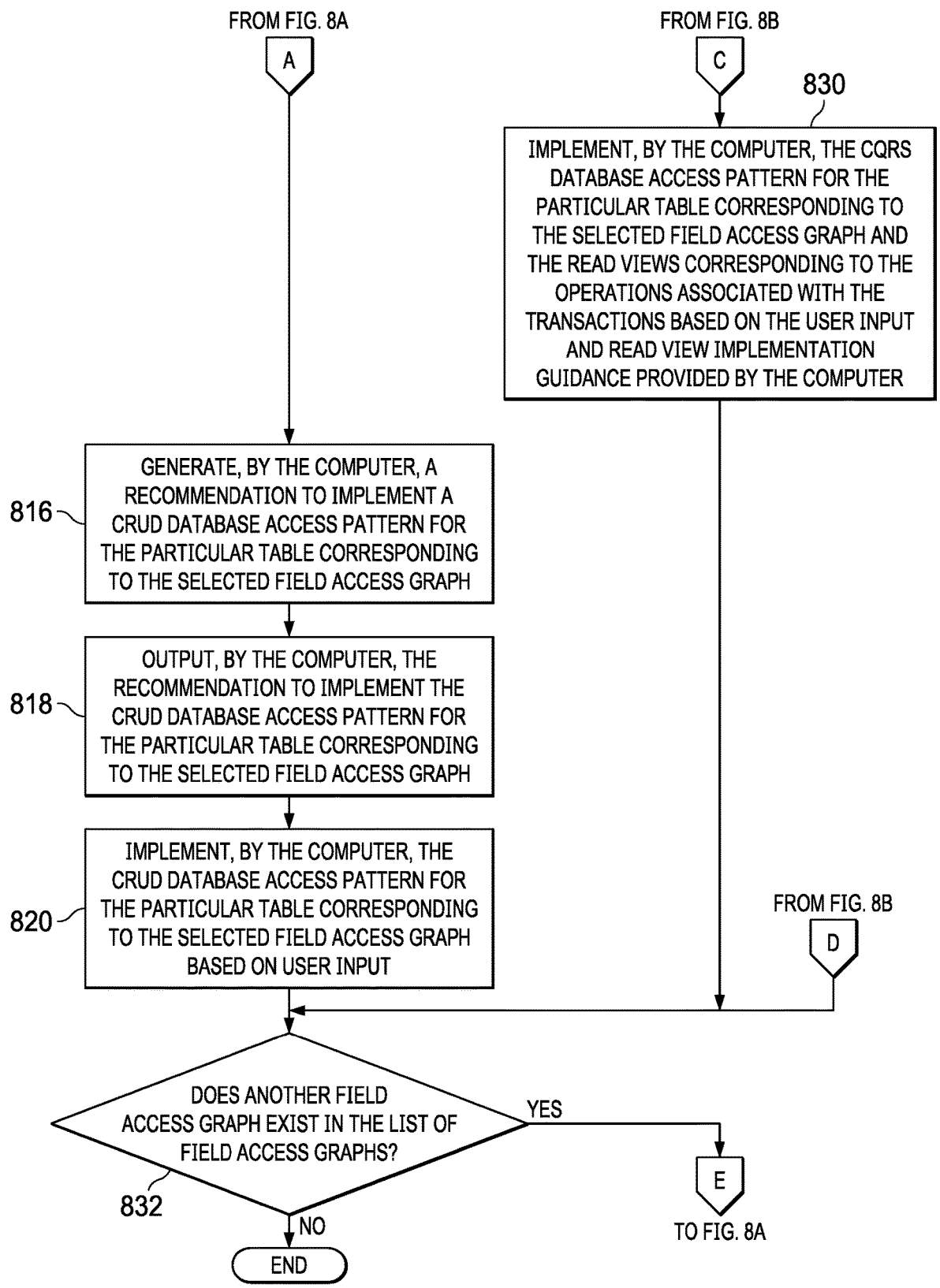

With reference now to FIGS. 8A-8C, a flowchart illustrating a process for recommending database access patterns for transactions in microservices is shown in accordance with an illustrative embodiment. The process shown in FIGS. 8A-8C may be implemented in a computer, such as, for example, server 104 in FIG. 1 or data processing system 200 in FIG. 2. For example, the process shown in FIGS. 8A-8C may be implemented in recommendation manager 218 in FIG. 2.

The process begins when the computer retrieves a list of field access graphs corresponding to tables of a database of a microservice running on the computer (step 802). Afterward, the computer selects a field access graph corresponding to a particular table in the list of field access graphs to form a selected field access graph (step 804). In addition, the computer generates a total read value corresponding to the selected field access graph based on a total number of read invocations on the particular table (step 806).

Further, the computer identifies a category for each respective operation included in the selected field access graph corresponding to the particular table (step 808). Furthermore, the computer scores each respective operation included in the selected field access graph corresponding to the particular table according to an identified category of a given operation based on information in a user-defined write effect/read ratios table biased to a CQRS database access pattern (step 810). Moreover, the computer adds the score of each respective operation included in the selected field access graph corresponding to the particular table together to generate a total operations score of the selected field access graph (step 812).

The computer makes a determination as to whether the total operations score of the selected field access graph is greater than zero (step 814). If the computer determines that the total operations score of the selected field access graph is not greater than zero, no output of step 814, then the computer generates a recommendation to implement a CRUD database access pattern for the particular table corresponding to the selected field access graph (step 816). The computer outputs the recommendation to implement the CRUD database access pattern for the particular table corresponding to the selected field access graph (step 818). The computer also implements the CRUD database access pattern for the particular table corresponding to the selected field access graph based on user input (step 820). Thereafter, the process proceeds to step 832.

Returning again to step 814, if the computer determines that the total operations score of the selected field access graph is greater than zero, yes output of step 814, then the computer makes a determination as to whether a total write score of the selected field access graph is greater than a database threshold of the database defined in a database profile of the database (step 822). If the computer determines that the total write score of the selected field access graph is not greater than the database threshold of the database defined in the database profile of the database, no output of step 822, then the computer generates a recommendation to implement the CQRS database access pattern for the particular table corresponding to the selected field access graph (step 824). In addition, the computer generates read views corresponding to operations associated with transactions included in the selected field access graph of the particular table according to the CQRS database access pattern (step 826). Further, the computer outputs the recommendation to implement the CQRS database access pattern for the particular table corresponding to the selected field access graph (step 828). Furthermore, the computer implements the CQRS database access pattern for the particular table corresponding to the selected field access graph and the read views corresponding to the operations associated with the transactions based on the user input and view implementation guidance provided by the computer (step 830).

Moreover, the computer makes a determination as to whether another field access graph exists in the list of field access graphs (step 832). If the computer determines that another field access graph does exist in the list of field access graphs, yes output of step 832, then the process returns to step 804 where the computer selects another field access graph from the list of field access graphs. If the computer determines that another field access graph does not exist in the list of field access graphs, no output of step 832, then the process terminates thereafter.

Returning again to step 822, if the computer determines that the total write score of the selected field access graph is greater than the database threshold of the database defined in the database profile of the database, yes output of step 822, then the computer generates a recommendation to implement a CQRS/ES database access pattern for the particular table corresponding to the selected field access graph (step 834). The computer also generates read views corresponding to operations associated with transactions included in the selected field access graph of the particular table according to the CQRS/ES database access pattern (step 836). In addition, the computer outputs the recommendation to implement the CQRS/ES database access pattern for the particular table corresponding to the selected field access graph (step 838). Further, the computer implements the CQRS/ES database access pattern for the particular table corresponding to the selected field access graph and the read views corresponding to the operations associated with the transactions based on the user input and the view implementation guidance provided by the computer (step 840). Thereafter, the process returns to step 832 where the computer determines whether another field access graph exists in the list of field access graphs.

Thus, illustrative embodiments of the present invention provide a computer-implemented method, computer system, and computer program product for automatically recommending and implementing a particular database access pattern for transactions to access data more efficiently in a database corresponding to a microservice based on a system description of the microservice. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for recommending database access patterns for transactions in microservices, the computer-implemented method comprising:

generating, by a computer, a recommendation of a particular database access pattern to improve access by transactions to data in fields of tables in a database corresponding to a microservice based on analysis of field access graphs for the tables accessed by the transactions wherein each field access graph from the field access graphs comprises relationships between transactions, database operations, and fields accessed in a table from tables in a database;

outputting, by the computer, the recommendation of the particular database access pattern; and implementing, by the computer, the particular database access pattern to improve access by the transactions to the data in the fields of the tables in the database corresponding to the microservice to improve performance of the microservice based on user input and read view implementation guidance provided by the computer.

2. The computer-implemented method of claim 1 further comprising:

retrieving, by the computer, a system description of the microservice and a usage profile of the transactions corresponding to the microservice;

performing, by the computer, an analysis of the system description of the microservice and the usage profile of the transactions corresponding to the microservice; and generating, by the computer, the field access graphs for the tables accessed by the transactions based on the analysis of the system description of the microservice and the usage profile of the transactions corresponding to the microservice.

3. The computer-implemented method of claim 1 further comprising:

retrieving, by the computer, a database profile of the database corresponding to the microservice that contains the tables accessed by the transactions;

performing, by the computer, an analysis of the field access graphs in conjunction with the database profile of the database corresponding to the microservice that contains the tables accessed by the transactions; and generating, by the computer, the recommendation of the particular database access pattern to improve access by the transactions to the data in the fields of the tables in the database based on the analysis of the field access graphs in conjunction with the database profile of the database corresponding to the microservice that contains the tables accessed by the transactions.

4. The computer-implemented method of claim 1 further comprising:

retrieving, by the computer, a system description of the microservice running on the computer and a usage profile of the transactions corresponding to the microservice;

generating, by the computer, a field access graph for a selected table in the database corresponding to the microservice based on the system description of the microservice and the usage profile of the transactions corresponding to the microservice; and identifying, by the computer, any groups of connected components in the field access graph corresponding to the selected table.

5. The computer-implemented method of claim 4 further comprising:

determining, by the computer, whether more than one group of connected components is identified in the field access graph for the selected table; and responsive to the computer determining that more than one group of connected components is not identified in the field access graph for the selected table, storing, by the computer, the field access graph for the selected table.

6. The computer-implemented method of claim 5 further comprising:

responsive to the computer determining that more than one group of connected components is identified in the field access graph for the selected table, splitting, by the computer, the selected table into a plurality of new tables based on identified groups of connected components in the selected table; and adding, by the computer, the plurality of new tables to a list of tables in the database corresponding to the microservice.

7. The computer-implemented method of claim 1 further comprising:

selecting, by the computer, a field access graph corresponding to a particular table in the database corresponding to the microservice from a list of field access graphs to form a selected field access graph;

generating, by the computer, a total read value corresponding to the selected field access graph based on a total number of read invocations on the particular table; and identifying, by the computer, a category for each respective operation included in the selected field access graph corresponding to the particular table.

8. The computer-implemented method of claim 7 further comprising:

scoring, by the computer, each respective operation included in the selected field access graph corresponding to the particular table according to an identified category of a given operation based on information in a user-defined write/read ratios table;

adding, by the computer, a score of each respective operation included in the selected field access graph corresponding to the particular table together to generate a total operations score of the selected field access graph; and determining, by the computer, whether the total operations score of the selected field access graph is greater than zero.

9. The computer-implemented method of claim 8 further comprising:

responsive to the computer determining that the total operations score of the selected field access graph is not greater than zero, generating, by the computer, the recommendation to implement a create, read, update, and delete (CRUD) database access pattern for the particular table corresponding to the selected field access graph;

outputting, by the computer, the recommendation to implement the CRUD database access pattern for the particular table corresponding to the selected field access graph; and implementing, by the computer, the CRUD database access pattern for the particular table corresponding to the selected field access graph based on the user input.

10. The computer-implemented method of claim 8 further comprising:

responsive to the computer determining that the total operations score of the selected field access graph is greater than zero, determining, by the computer, whether a total write score of the selected field access graph is greater than a database threshold of the database corresponding to the microservice;
responsive to the computer determining that the total write score of the selected field access graph is not greater than the database threshold of the database corresponding to the microservice, generating, by the computer, the recommendation to implement a command query responsibility segregation (CQRS) database access pattern for the particular table corresponding to the selected field access graph;
generating, by the computer, read views corresponding to operations associated with transactions included in the selected field access graph of the particular table according to the CQRS database access pattern;
outputting, by the computer, the recommendation to implement the CQRS database access pattern for the particular table corresponding to the selected field access graph; and
implementing, by the computer, the CQRS database access pattern for the particular table corresponding to the selected field access graph and the read views corresponding to the operations associated with the transactions based on the user input and the read view implementation guidance provided by the computer.

11. The computer-implemented method of claim 10 further comprising:
responsive to the computer determining that the total write score of the selected field access graph is greater than the database threshold of the database corresponding to the microservice, generating, by the computer, the recommendation to implement a CQRS/event sourcing (ES) database access pattern for the particular table corresponding to the selected field access graph;
generating, by the computer, read views corresponding to operations associated with transactions included in the selected field access graph of the particular table according to the CQRS/ES database access pattern;
outputting, by the computer, the recommendation to implement the CQRS/ES database access pattern for the particular table corresponding to the selected field access graph; and
implementing, by the computer, the CQRS/ES database access pattern for the particular table corresponding to the selected field access graph and the read views corresponding to the operations associated with the transactions based on the user input and the read view implementation guidance provided by the computer.

12. A computer system for recommending database access patterns for transactions in microservices, the computer system comprising:
a bus system;
a storage device connected to the bus system, wherein the storage device stores program instructions; and
a processor connected to the bus system, wherein the processor executes the program instructions to:
generate a recommendation of a particular database access pattern to improve access by transactions to data in fields of tables in a database corresponding to a microservice based on analysis of field access graphs for the tables accessed by the transactions, wherein each field access graph from the field access graphs comprises relationships between transactions, database operations, and fields accessed in a table from tables in a database;
output the recommendation of the particular database access pattern; and
implement the particular database access pattern to improve access by the transactions to the data in the fields of the tables in the database corresponding to the microservice to improve performance of the microservice based on user input and read view implementation guidance.

13. The computer system of claim 12, wherein the processor further executes the program instructions to:
retrieve a system description of the microservice and a usage profile of the transactions corresponding to the microservice;
perform an analysis of the system description of the microservice and the usage profile of the transactions corresponding to the microservice; and
generate the field access graphs for the tables accessed by the transactions based on the analysis of the system description of the microservice and the usage profile of the transactions corresponding to the microservice.

14. The computer system of claim 12, wherein the processor further executes the program instructions to:
retrieve a database profile of the database corresponding to the microservice that contains the tables accessed by the transactions;
perform an analysis of the field access graphs in conjunction with the database profile of the database corresponding to the microservice that contains the tables accessed by the transactions; and
generate the recommendation of the particular database access pattern to improve access by the transactions to the data in the fields of the tables in the database based on the analysis of the field access graphs in conjunction with the database profile of the database corresponding to the microservice that contains the tables accessed by the transactions.

15. A computer program product for recommending database access patterns for transactions in microservices, the computer program product comprising a computer-readable storage medium having program instructions embodied therewith, the program instructions executable by a computer to cause the computer to perform a method of:
generating, by the computer, a recommendation of a particular database access pattern to improve access by transactions to data in fields of tables in a database corresponding to a microservice based on analysis of field access graphs for the tables accessed by the transactions wherein each field access graph from the field access graphs comprises relationships between transactions, database operations, and fields accessed in a table from tables in a database;
outputting, by the computer, the recommendation of the particular database access pattern; and
implementing, by the computer, the particular database access pattern to improve access by the transactions to the data in the fields of the tables in the database corresponding to the microservice to improve performance of the microservice based on user input and read view implementation guidance provided by the computer.

16. The computer program product of claim 15 further comprising:
retrieving, by the computer, a system description of the microservice and a usage profile of the transactions corresponding to the microservice;
performing, by the computer, an analysis of the system description of the microservice and the usage profile of the transactions corresponding to the microservice; and generating, by the computer, the field access graphs for the tables accessed by the transactions based on the analysis of the system description of the microservice and the usage profile of the transactions corresponding to the microservice.

17. The computer program product of claim 15 further comprising:
retrieving, by the computer, a database profile of the database corresponding to the microservice that contains the tables accessed by the transactions;
performing, by the computer, an analysis of the field access graphs in conjunction with the database profile of the database corresponding to the microservice that contains the tables accessed by the transactions; and
generating, by the computer, the recommendation of the particular database access pattern to improve access by the transactions to the data in the fields of the tables in the database based on the analysis of the field access graphs in conjunction with the database profile of the database corresponding to the microservice that contains the tables accessed by the transactions.

18. The computer program product of claim 15 further comprising:
retrieving, by the computer, a system description of the microservice running on the computer and a usage profile of the transactions corresponding to the microservice;
generating, by the computer, a field access graph for a selected table in the database corresponding to the microservice based on the system description of the microservice and the usage profile of the transactions corresponding to the microservice; and
identifying, by the computer, any groups of connected components in the field access graph corresponding to the selected table.

19. The computer program product of claim 18 further comprising:
determining, by the computer, whether more than one group of connected components is identified in the field access graph for the selected table; and
responsive to the computer determining that more than one group of connected components is not identified in the field access graph for the selected table, storing, by the computer, the field access graph for the selected table.

20. The computer program product of claim 18 further comprising:
responsive to the computer determining that more than one group of connected components is identified in the field access graph for the selected table, splitting, by the computer, the selected table into a plurality of new tables based on identified groups of connected components in the selected table; and
adding, by the computer, the plurality of new tables to a list of tables in the database corresponding to the microservice.

* * * * *